United States Patent [19]

Hahn

[11] Patent Number: 5,659,236
[45] Date of Patent: Aug. 19, 1997

[54] BATTERY CHARGER WITH COLLAPSIBLE BATTERY POSITIONING AND SUPPORT APPARATUS

[75] Inventor: Stan S. Hahn, Moraga, Calif.

[73] Assignee: Asian Micro Sources, Inc., Morage, Calif.

[21] Appl. No.: 612,168

[22] Filed: Mar. 7, 1996

[51] Int. Cl.$^6$ .............................. H01M 10/46; H01M 2/10
[52] U.S. Cl. ........................................ 320/2; 429/99
[58] Field of Search ................................ 320/2; 429/96, 429/97, 98, 99, 100; D13/107, 108

[56] References Cited

U.S. PATENT DOCUMENTS

| 5,028,859 | 7/1991 | Johnson et al. |
| 5,034,871 | 7/1991 | Okamoto et al. |
| 5,059,885 | 10/1991 | Weiss et al. |
| 5,327,067 | 7/1994 | Scholder ........................................ 320/2 |
| 5,369,352 | 11/1994 | Toepfer et al. ................................ 320/2 |

FOREIGN PATENT DOCUMENTS

| 59-71270 | 4/1984 | Japan. |
| WO95/20828 | 8/1995 | WIPO. |

Primary Examiner—Edward Tso
Assistant Examiner—Patrick B. Law
Attorney, Agent, or Firm—Crosby, Heafey, Roach & May

[57] ABSTRACT

A collapsible battery charger having a casing with one or more folding supports that generally conform to the casing when closed and that provide receptacles when opened that position rechargeable batteries so as to form an electrical connection between the batteries and the charger. Preferably, an electronic circuit for converting supplied ac or dc current to dc current suitable for recharging batteries is housed in the casing. Interchangeable cords with a variety of plug conformations adapt the charger to standard electrical outlets. The folding supports can accommodate batteries of varying size and capacity and preferably are configured to mate with structural features on the intended batteries in order to securely support and accurately position the batteries on the charger. In a preferred form of the invention, the casing comprises a first support that pivots open to an obtuse angle and a second support that pivots open to an acute angle. In an alternative embodiment, the first support slides laterally in conjunction with pivoting open. The first support is configured to receive a battery that is attached to an electronic device and to allow operation of the electronic device while the battery is in connection with the charger.

5 Claims, 4 Drawing Sheets

BATTERY CHARGER WITH COLLAPSIBLE BATTERY POSITIONING AND SUPPORT APPARATUS

FIELD OF THE INVENTION

The present invention relates generally to power supplies and battery chargers and more particularly to integrated battery charger power supplies that are collapsible for convenient transportation or storage and are adaptable to the varying electrical and physical characteristics of electrical devices and outlets.

BACKGROUND OF THE INVENTION

Mobile electrical devices such as cellular phones often employ rechargeable batteries which, due to weight and size constraints, require frequent recharging. While many battery charger designs exist, they tend to be bulky and cumbersome. Yet because of the relatively short life of rechargeable batteries, the charger must be carried with the batteries for all but brief uses.

A typical and popular battery charger is exemplified in Weiss, et al., U.S. Pat. No. 5,059,885, assigned to Motorola, Inc. and incorporated by reference herein in its entirety. Weiss discloses a battery charger having a housing with two recesses for positioning and supporting batteries of different size or capacity. However, in order to support the batteries in their charging position, the battery charger housing must be relatively large and cumbersome. Moreover, available commercial embodiments of the apparatus disclosed in Weiss require an external power supply to power an internal battery charging circuit, thereby adding to the complexity and burden of using the available apparatus.

Accordingly, there is a need for a battery charger with reduced size to facilitate transportation and storage that is readily compatible with a variety of current supplies.

SUMMARY OF THE INVENTION

The present invention comprises a collapsible battery charger having a casing with one or more folding supports that generally conform to the casing when closed and that provide receptacles when opened that position rechargeable batteries so as to form an electrical connection between the batteries and the charger. Preferably, the casing also houses an electronic circuit for transforming supplied ac or dc current to dc current suitable for recharging batteries. Interchangeable cords with a variety of plug conformations adapt the charger to standard electrical outlets such as United States, United Kingdom, European or cigarette lighter. Alternatively, the converter circuitry could be housed in a separate device connected to the casing by a cord. The folding supports can accommodate batteries of varying size and capacity and preferably are configured to mate with structural features on the intended batteries in order to securely support and accurately position the batteries on the charger, thus providing a robust electrical connection between the batteries and the charger.

In a preferred form of the invention, the casing comprises two folding supports. The first support pivots open to an obtuse angle while the second support pivots open to an acute angle. The first support is configured to receive a battery that is attached to an electronic device and to allow operation of the electronic device while the battery is in connection with the charger. More preferably, the folding supports have ribs configured to engage the standardized channels found on popular rechargeable batteries to support and position the batteries. In an alternative form of the invention, the casing has a track system which allows the first support to slide laterally before opening to an obtuse angle.

DETAILED DESCRIPTION OF THE PREFERRED EMBODIMENTS

Figure 1:
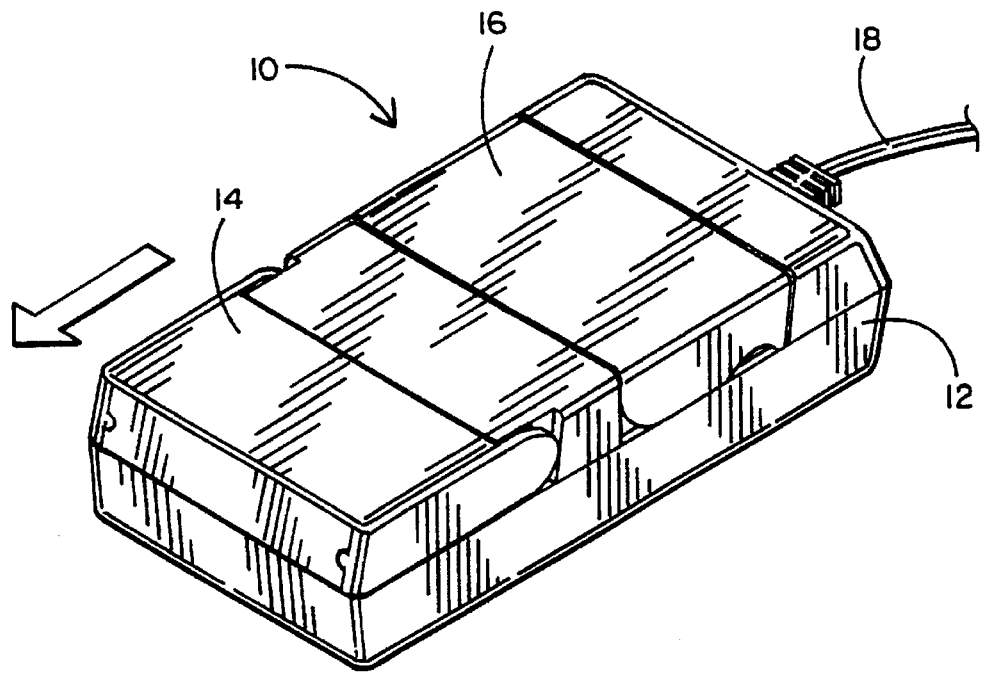
FIG. 1 illustrates an isometric view of a battery charger of the present invention in a collapsed and closed configuration with the two supports folded onto the casing.

As shown in FIG. 1, battery charger 10 comprises a casing 12 having two folding supports 14 and 16 that conform to casing 12 when closed providing a relatively small and compact device. Casing 12 also comprises a receptacle (not shown) into which cord 18 plugs. Preferably, casing 12 has electronic circuitry (not shown) that converts ac or dc current from standard supplies into dc current suitable for charging a battery. Such circuits are well known to those skilled in the art. Suitable examples are U.S. Pat. No. 5,028,859 to Johnson et al. and U.S. Pat. No. 5,034,871 to Okamoto et al., both of which are hereby incorporated by reference in their entirety. The circuitry may also be designed to provide power for an electronic device using the battery.

Figure 2:
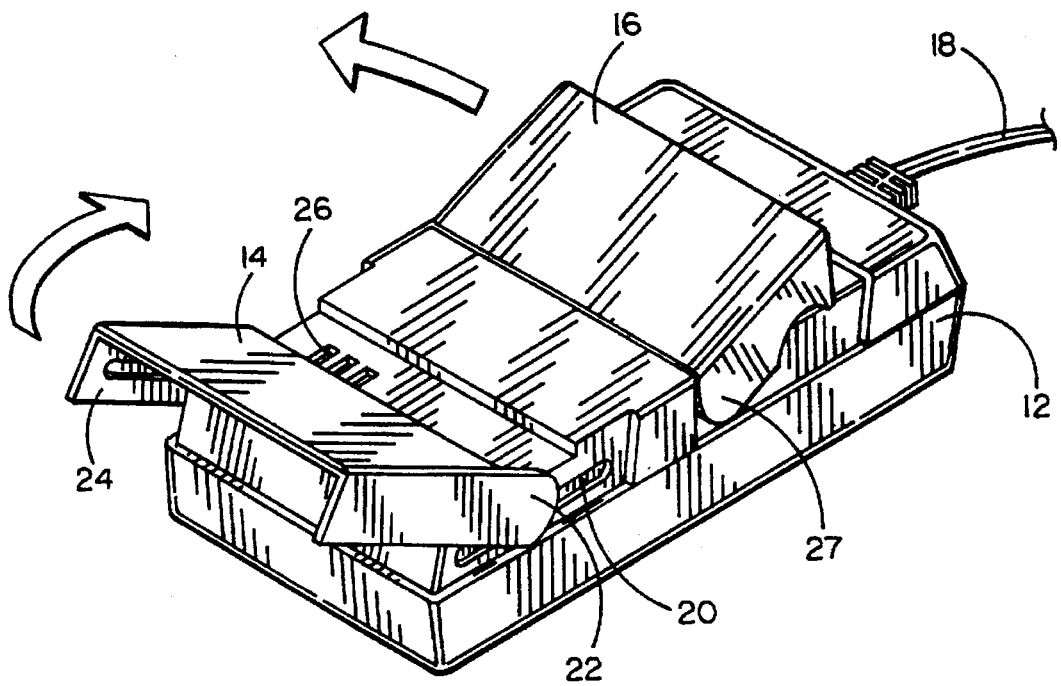
FIG. 2 is an isometric view, showing the battery charger in the process of being opened.

FIG. 2 shows folding supports 14 and 16 in the process of opening. Folding support 14 engages track 20 at hinge 22 and rib 24. Sliding support 14 forward frees rib 24 from track 20, allowing support 14 to pivot open to an obtuse angle at hinge 22. This operation exposes connector 26 which is wired to the converter circuitry. Connector 26 is configured to engage a complementary connector on a supported battery. Folding support 16 is connected to casing 12 at hinge 27. Folding support 16 pivots open without lateral movement to an acute angle and also reveals a connector (not shown) on casing 12 for mating with a battery held in position by support 16.

Figure 3:
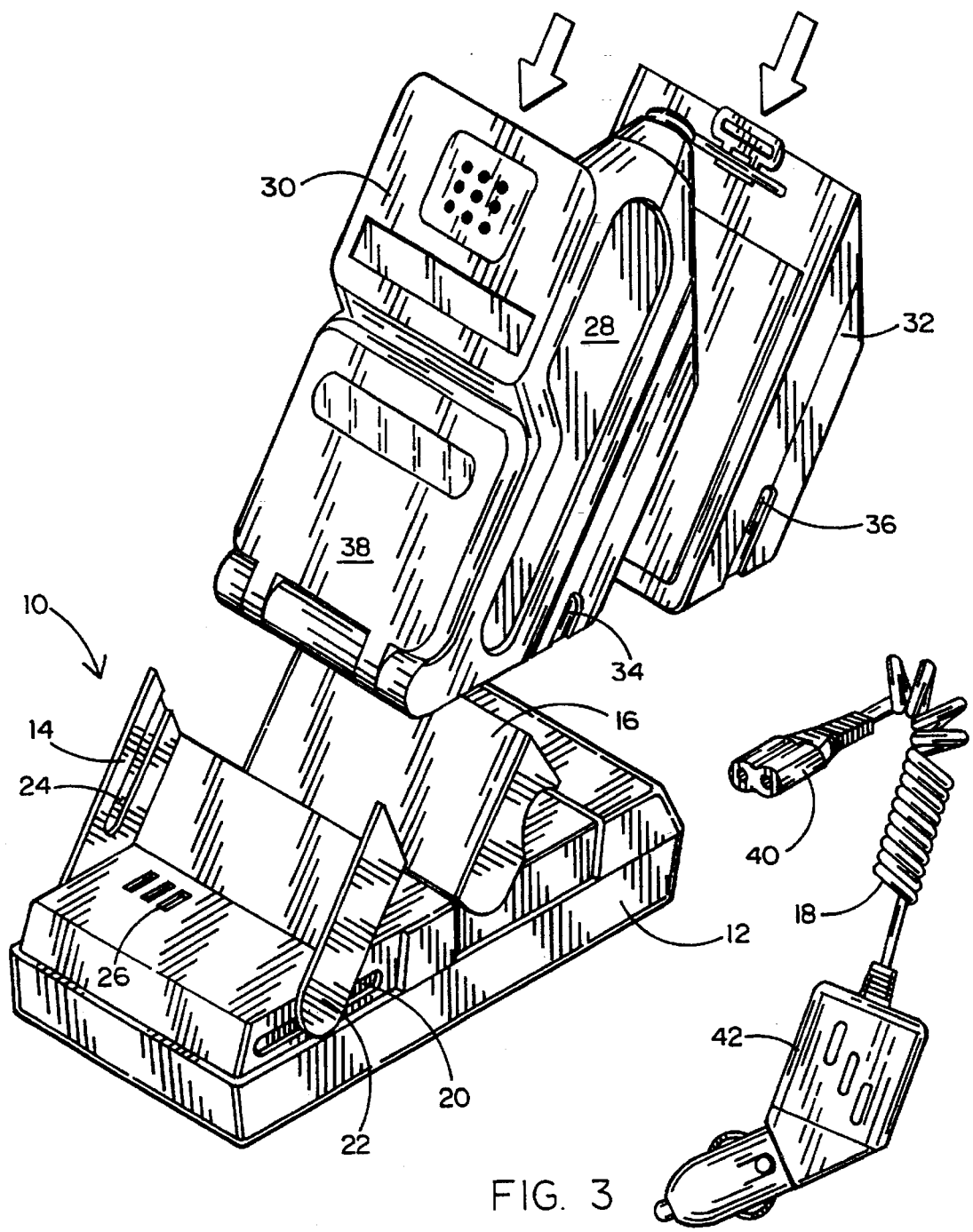
FIG. 3 is an isometric view that illustrates the battery charger in a fully opened configuration with the folding supports receiving a battery pack attached to a cellular telephone and a battery pack alone for recharging.

FIG. 3 illustrates battery charger 10 after folding supports 14 and 16 have been opened and are ready to receive battery 28 attached to cellular telephone 30 and battery 32 alone. Rib 24 of folding support 14 is configured to engage channel 34 of battery 28 to guide the battery into position on casing 11 and to mate with connector 26. In a similar manner, ribs (not shown) on folding support 16 engage channel 36 of battery 32 to support and position the battery to mate with the other connector (not shown) on the casing. The obtuse angle of opened support 14 permits mouthpiece 38 of telephone 30 to be opened, allowing the telephone to be used while battery 28 is connected to charger 10.

Figure 4A:
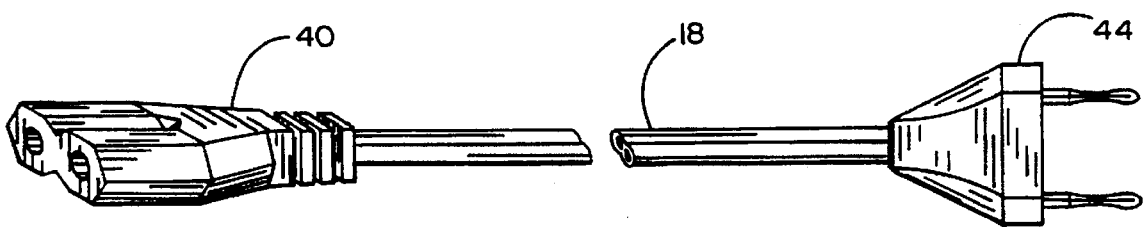
FIGS. 4A, 4B and 4C are isometric views showing interchangeable cords for use with the battery charger having differing plug configurations to accommodate a variety of standardized electrical outlets.
Figure 4B:
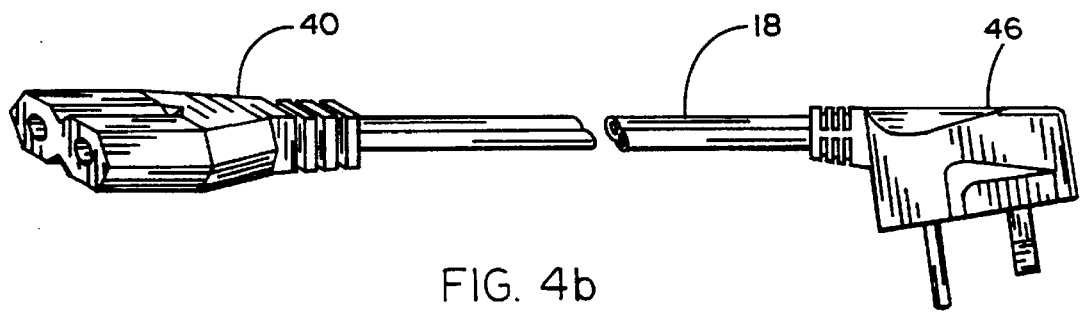
Figure 4C:
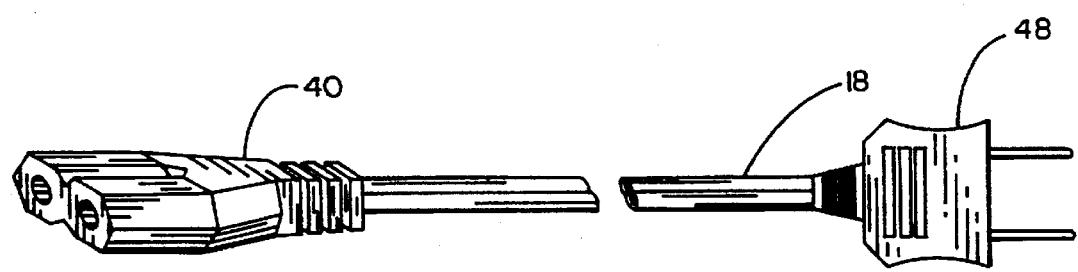

Cord 18 comprises a plug 40 for connecting with the receptacle on casing 12 and another plug 42 adapted for a particular electrical outlet. Plug 42 is configured for a standard cigarette lighter, to allow the use of charger 10 in an automobile. Refinements of plug 42 are detailed in U.S. patent application Ser. No. 08/414,208, filed Mar. 30, 1995, "Cigarette Lighter Adapter with Flexible Diameter" on behalf of S. Hahn and assigned to the assignee of the present invention which is hereby incorporated by reference. Similarly, as shown in FIG. 4, cord 18 may comprise a plug 44 (FIG. 4A) configured for standard European outlets, a plug 46 (FIG. 4B) configured for standard United Kingdom outlets or a plug 48 (FIG. 4C) configured for standard United States outlets. Other types of plugs may be suitable depending on the application, or may be adaptable designs that fit many types of outlets. In other embodiments of the invention, charger 10 may comprise prongs to allow connection to an outlet directly, without the need of cord 18. Examples of such prong configurations are found in U.S. patent application Ser. No. {new}, filed Nov. 3, 1995, a file wrapper continuation of Ser. No. 08/201,474, "Collapsible Plug Device For Battery Charger," on behalf of S. Hahn and assigned to the assignee of the present invention which is hereby incorporated by reference.

Figure 5:
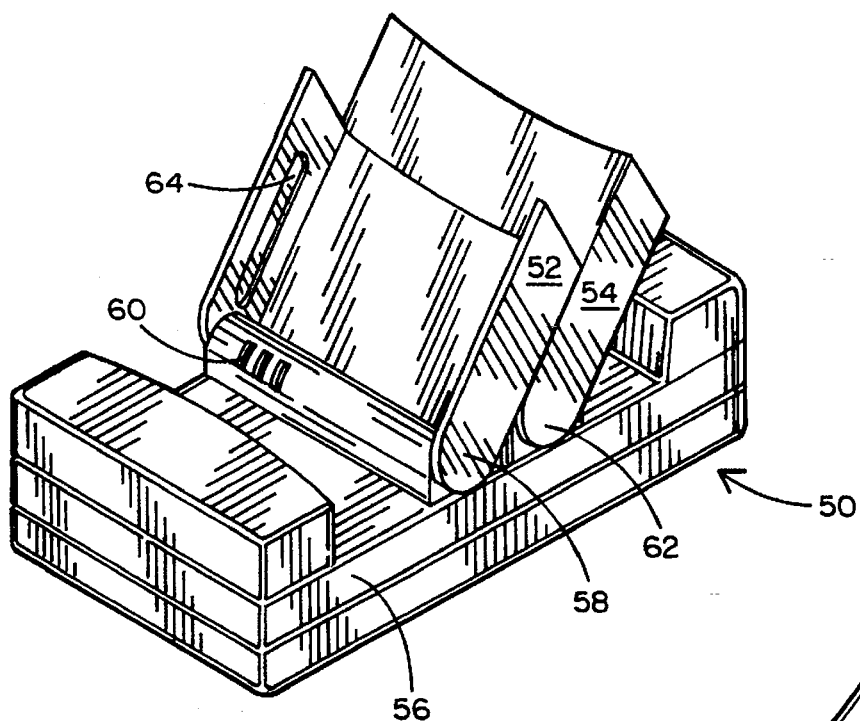
FIG. 5 is an isometric view showing a preferred form of the invention with opened folding supports.
Figure 6:
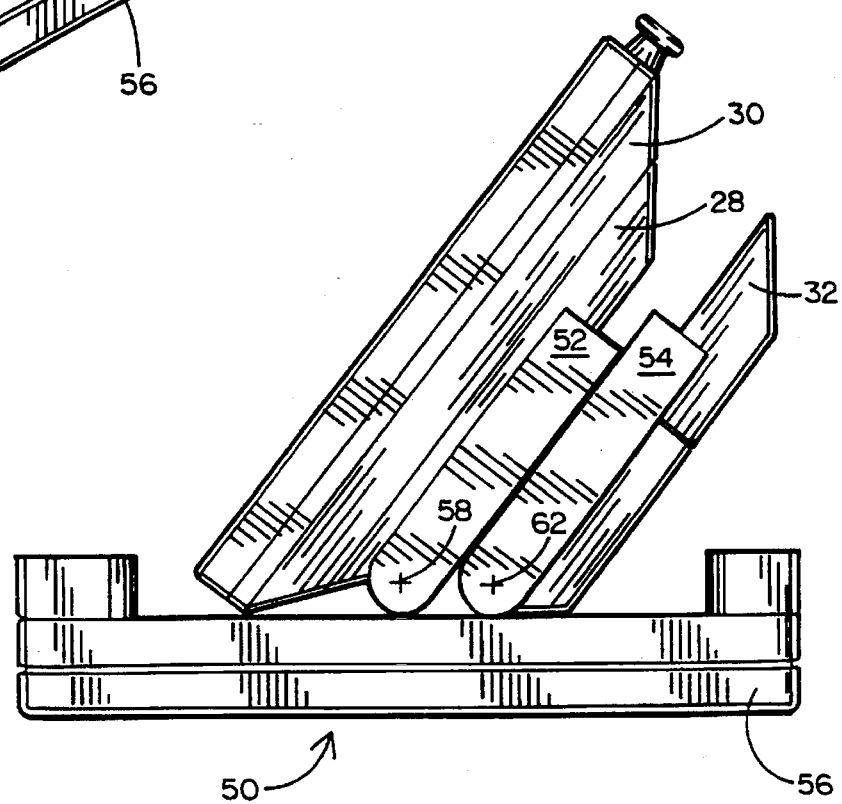
FIG. 6 is an isometric view showing a preferred form with the folding supports receiving a battery pack attached to a cellular telephone and a battery pack alone for recharging.

FIGS. 5 and 6 show a preferred form of the invention wherein the battery charger 50 has two folding supports 52 and 54 which open by pivoting only. Folding support 52 is connected to casing 56 at hinge 58 and is configured to open to an obtuse angle. The opening of folding support 52 uncovers connector 60 to engage the battery. Similarly, folding support 54 is connected to casing 56 at hinge 62, but is configured to open to an acute angle. Opening folding support 54 also exposes a connector (not shown). Folding support 52 has a rib 64 configured to engage a battery or other electronic device, as described above, to support and position it to mate with connector 60. Folding support 54 has similar features. FIG. 6 shows opened battery charger 50 supporting and positioning battery 28 attached to cellular telephone 30 and battery 32 alone.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An apparatus for charging a battery, said apparatus comprising a casing having at least two folding supports which conform to the casing when closed and which are configured to receive and position a battery in electrical connection with the casing when opened.

2. The apparatus of claim 1, wherein a first folding support engages a track on the casing, allowing the first support to slide laterally and pivot open to an obtuse angle.

3. The apparatus of claim 2, wherein a second folding support is hinged to the casing, allowing the second support to pivot open to an acute angle.

4. The apparatus of claim 3, wherein the first and second folding supports comprise a surface having a rib configured to engage a channel on the battery and wherein the casing comprises a receptacle to receive input electrical current and further comprising a detachable electrical cord having a first and second plug, wherein the first plug is configured to form an electrical connection with the casing receptacle and wherein the second plug is configured to form an electrical connection with an electric current supply outlet.

5. The apparatus of claim 2, wherein the first support is configured to receive a battery attached to an electrical device and allow operation of the electrical device while the battery is in electrical connection with the casing.

* * * * *

UNITED STATES PATENT AND TRADEMARK OFFICE
CERTIFICATE OF CORRECTION

PATENT NO. : 5,659,236

DATED : August 19, 1997

INVENTOR(S) : Hahn

It is certified that error appears in the above-identified patent and that said Letters Patent is hereby corrected as shown below:

In column 2, line 36, delete "de" and insert therefor --dc--.

In column 2, line 61, delete "11" and insert therefor --12--.

In column 3, line 6, after "filed Mar. 30, 1995," insert --and issued May 6, 1997, as U.S. Pat. No. 5,626,496,--.

In column 3, line 20, delete "{new}" and insert therefor --08/553,085--.

In column 3, line 21, after "08/201,474," insert --and issued May 13, 1997, as U.S. Patent No. 5,628,641,--.

Signed and Sealed this

Eighteenth Day of November 1997

*Attest:*

BRUCE LEHMAN

*Attesting Officer*   *Commissioner of Patents and Trademarks*